United States Patent [19]
Chu et al.

[11] Patent Number: 5,922,797
[45] Date of Patent: Jul. 13, 1999

[54] LATEX FOR FIBER ADHESION

[75] Inventors: Judy Chu, Hudson; Dane Kenton Parker, Massillon; James Gregory Gillick, Akron, all of Ohio

[73] Assignee: The Goodyear Tire & Rubber Company, Akron, Ohio

[21] Appl. No.: 09/015,678

[22] Filed: Jan. 29, 1998

Related U.S. Application Data

[60] Provisional application No. 60/040,478, Mar. 12, 1997.

[51] Int. Cl.$^6$ ........................................ C08K 5/13
[52] U.S. Cl. ..................... 524/346; 428/36.1; 524/555
[58] Field of Search ........................... 428/36.1; 524/346, 524/555

[56] References Cited

U.S. PATENT DOCUMENTS

| | | | |
|---|---|---|---|
| 4,162,240 | 7/1979 | Hino | 524/813 |
| 4,168,369 | 9/1979 | Lasis | 525/381 |
| 4,888,334 | 12/1989 | Ohga | 503/214 |
| 5,559,202 | 9/1996 | Yoshikawa | 526/207 |

*Primary Examiner*—Paul R. Michl
*Attorney, Agent, or Firm*—Alvin T Rockhill

[57] ABSTRACT

This invention relates to a latex for utilization in adhesive compositions for bonding synthetic fibers to natural or synthetic rubber. These latices can be produced at reduced cost and their utilization results in improved performance characteristics. This invention more specifically discloses a latex which is particularly useful for adhering synthetic fibers to rubber which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer. The present invention further discloses a process for adhering synthetic textile fibers to sulfur vulcanizable rubbers comprising the steps of (I) immersing said fibers in an aqueous dispersion of (1) resorcinol, (2) formaldehyde and (3) a latex which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer, to produce dipped fibers; (II) drying said dipped fibers to produce dried dipped fibers; (III) placing the dried dipped fibers in contact with the sulfur vulcanizable rubber; and (IV) curing the sulfur vulcanizable rubber while it is in contact with said dried dipped fibers.

52 Claims, No Drawings

LATEX FOR FIBER ADHESION

This application claims the benefit of U.S. Provisional Application 60/040,478 filed Mar. 12, 1997.

FIELD OF THE INVENTION

This invention relates to adhesives and particularly to latex adhesives for bonding synthetic fibers, such as nylon or polyester fibers, to rubber. Such compositions are used in manufacturing tires to bond tire reinforcing fabrics to tire rubber compositions.

BACKGROUND OF THE INVENTION

In the manufacture of many fabric-reinforced, molded rubber articles, especially automobile and truck tires, it is desirable to obtain strong adherence between the fabric and the rubber, and also high resistance to deterioration of the bond with flexing of the structure. In the case of pneumatic tires, the flex-life of the carcass is one of the most critical factors affecting the life of the tire. Long flex-life is dependent not only upon the inherent flexibility of the carcass structure and the strength of the bond between the tire fabric and the adjacent rubber, but also upon fatigue resistance under repeated flexing over long periods of time.

Many adhesives known to produce very strong bonds between rubber and fabric are entirely unsuitable for many rubber fabric structures because the bonds deteriorate or the fabric ruptures when the structures are subjected to repeated flexing. Thus, flex-life cannot be foretold from measurements of bond strengths alone.

It is possible to calender rubber into cotton fabrics in such a manner as to work the rubber between the fibers of the individual cotton cords or threads, thus obtaining a mechanical interlocking of the two materials. Such practices were followed for many years even though they were not entirely satisfactory. It should also be noted that such calendering procedures are substantially inoperative when applied to most continuous synthetic fibers, such as nylon, polyester and aramid fibers, which are formed into cords by a twisting process that leaves the cords virtually devoid of interstices into which the rubber can be forced by the calendering rolls. Since cotton fabrics are not widely used today as reinforcements for tires and other industrial rubber products, such calendering procedures are not a viable means for attaining needed levels of fabric to rubber adhesion.

The problem of obtaining satisfactory adhesion between rubber and cords of synthetic fibers was the principal obstacle that delayed the use of synthetic fibers in fabrics for pneumatic tire carcasses. The problem was finally solved to a degree, in the case of rayon, by the use of mixtures of natural latex and resorcinol or casein. The casein-latex adhesive was comparatively flexible, but the strength and character of the adhesive bond obtained left much to be desired. The resorcinol-formaldehyde latex mixture was developed and widely used in the tire industry, particularly with rayon fabrics. While fair adhesion was obtainable with that adhesive, it formed a relatively hard and stiff film on the fabric that seriously impaired its flexibility and flex-life and the adhesion between synthetic rubber and fabrics was nowhere nearly as good as desired.

U.S. Pat. No. 2,748,049 discloses an adhesive dip which is reported to strongly adhere to fabric and rubber and which is further reported to be relatively flexible. This dip is made utilizing a latex of a copolymer of a conjugated diolefin monomer, such as butadiene, and an unsaturated aldehyde monomer, such as methacrolein. However, dips made with such latices have never proven to be commercially viable.

In actual commercial practice, resorcinol-formaldehyde-latex (RFL) dips have been widely implemented by the tire industry for bonding synthetic fabrics to rubber. For instance, U.S. Pat. No. 3,525,703 discloses a water-based adhesive composition for bonding synthetic fiber material to rubber. The teachings of U.S. Pat. No. 3,525,703 specifically disclose the utilization of styrene-butadiene latex and vinylpyridine-styrene-butadiene latex in such water-based adhesive compositions.

SUMMARY OF THE INVENTION

This invention relates to an improved latex for utilization in RFL dips. This latex can be produced at reduced cost and improves rubber to fabric adhesion characteristics. More specifically, the use of the latex of this invention in making tires and other fabric reinforced industrial rubber products can result in less thermal degradation of the fabric, especially polyester fabrics.

The present invention more specifically discloses a latex which is particularly useful for adhering synthetic fibers to rubber which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer.

The subject invention further reveals an adhesive composition which is particularly useful for adhering synthetic fibers to rubber which is comprised of (1) resorcinol, (2) formaldehyde and (3) a latex which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer.

The present invention also discloses a process for adhering synthetic textile fibers to sulfur vulcanizable rubbers comprising the steps of (I) immersing said fibers in an aqueous dispersion of (1) resorcinol, (2) formaldehyde and (3) a latex which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer, to produce dipped fibers; (II) drying said dipped fibers to produce dried dipped fibers; (III) placing the dried dipped fibers in contact with the sulfur vulcanizable rubber; and (IV) curing the sulfur vulcanizable rubber while it is in contact with said dried dipped fibers.

The subject invention further reveals a composite article of rubber and fabric comprising textile fibers having over surface portions thereof a mixture of (a) a polymer which is comprised of repeat units which are derived from (i) a conjugated diolefin monomer, (ii) a vinyl aromatic monomer, (iii) 2-vinylpyridine and (iv) a vinyl aldehyde monomer; (b) a resinous condensation product of a phenol and an aldehyde; and (c) an in situ vulcanized rubber compound contacting the coated surfaces of said fibers.

DETAILED DESCRIPTION OF THE INVENTION

The latices of this invention are prepared by free radical emulsion polymerization. The charge compositions used in the preparation of the latices of this invention contain monomers, at least one surfactant, and at least one free radical initiator. The monomer charge composition used in such polymerizations is comprised of (a) at least one conjugated diolefin monomer, (b) at least one vinyl aromatic monomer, (c) 2-vinylpyridine (VP) and (d) at least one vinyl aldehyde monomer.

The monomer charge composition will typically contain from about 45 weight percent to about 88 weight percent of the conjugated diolefin monomer, from about 10 weight percent to about 30 weight percent of the vinyl aromatic monomer, from about 1 weight percent to about 15 weight percent 2-vinylpyridine monomer, and from about 1 weight percent to about 10 weight percent of the vinyl aldehyde monomer. It is preferred for the monomer charge composition to contain from about 56 weight percent to about 82 weight percent of the conjugated diolefin monomer, from about 15 weight percent to about 28 weight percent of the vinyl aromatic monomer, from about 2 weight percent to about 10 weight percent 2-vinylpyridine monomer, and from about 1 weight percent to about 6 weight percent of the vinyl aldehyde monomer. It is most preferred for the monomer charge composition to contain from about 65 weight percent to about 75 weight percent of the conjugated diolefin monomer, from about 20 weight percent to about 25 weight percent of the vinyl aromatic monomer, from about 3 weight percent to about 6 weight percent of the 2-vinylpyridine monomer, and from about 2 weight percent to about 4 weight percent of the vinyl aldehyde monomer. The polymer being synthesized will typically be comprised of repeat units which have the same ratio of monomers as are in the monomer charge composition.

The conjugated diolefin monomer will typically contain from about 4 to about 8 carbon atoms. Isoprene and 1,3-butadiene are representative examples of highly preferred conjugated diolefin monomers with 1,3-butadiene being the most preferred. Some representative examples of vinyl aromatic monomers which can be used include styrene, alpha-methyl styrene and vinyl toluene. Styrene and alpha-methyl styrene are the preferred vinyl aromatic monomers. Due to its relatively low cost, styrene is the most preferred vinyl aromatic monomer.

The vinyl aldehyde monomers which are employed can be of the structural formula:

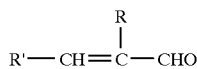

wherein R represents a hydrogen atom, an alkyl group containing from 1 to about 4 carbon atoms, a phenyl group, a benzyl group, an α-alkoxy group or an α-amido group and wherein R' represents a hydrogen atom, an alkyl group containing from 1 to about 4 carbon atoms, a phenyl group or a benzyl group. It is preferred for R to represent a methyl group or an ethyl group with methyl groups being the most preferred. It is preferred for R' to represent a hydrogen atom, a methyl group or an ethyl group. Methacrolein is the most preferred vinyl aldehyde monomer because it is commercially available and readily forms copolymers with the other monomers.

The vinyl aldehyde monomers which can be employed can also be of the structural formula:

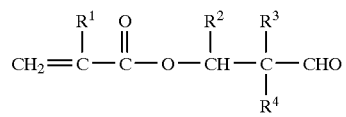

wherein $R^1$ represents a hydrogen atom or a methyl group, wherein $R^2$ represents a hydrogen atom or an alkyl group containing from 1 to 3 carbon atoms,
wherein $R^3$ represents a methyl group or an ethyl group, and wherein $R^4$ represents an alkyl group containing from 1 to 4 carbon atoms.

The vinyl aldehyde monomers which can be employed can also be of the structural formula:

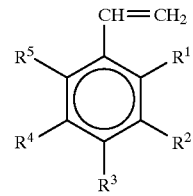

wherein $R^1$, $R^2$, $R^3$, $R^4$ and $R^5$ can be the same of different and are selected from the group consisting of hydrogen atoms, normal-alkyl groups and aldehyde functionality (—CHO), with the proviso that one and only one of said moieties selected from the group consisting of $R^1$, $R^2$, $R^3$, $R^4$ and $R^5$ is an aldehyde functionality.

The charge composition used in the preparation of the latices of this invention will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.2 phm (parts per hundred parts of monomer) to about 6 phm of at least one emulsifier. It is normally preferred for the emulsifier (surfactant) to be present in the polymerization medium at a level within the range of about 1 phm to about 5 phm. It is generally more preferred for the charge composition to contain from about 2 phm to about 4 phm of the emulsifier.

The emulsifiers used in the polymerization can be charged at the outset of the polymerization or may be added incrementally or by proportioning as the reaction proceeds. Generally, anionic emulsifier systems provide good results; however, any of the general types of anionic or nonionic emulsifiers may be employed in the polymerization.

Among the anionic emulsifiers that can be employed in emulsion polymerizations include fatty acids and their alkali metal soaps such as caprylic acid, capric acid, pelargonic acid, lauric acid, undecylic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

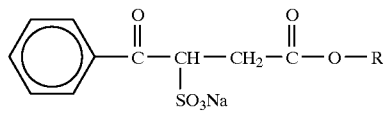

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonates; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonates derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acid, about 90 percent are isometric with abietic acid and the other 10 percent is a mixture of dehydro abietic acid and dihydro abietic acid.

The polymerization can be initiated using free radical generators, ultraviolet light or radiation. To ensure a satisfactory polymerization rate, uniformity and a controllable polymerization, free radical initiators are generally used. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane and the like, the various alkyl perketals, such as 2,2-bis-(t-butyl-peroxy)butane and the like. Water-soluble peroxygen-free radical initiators and redox systems are especially useful in such aqueous polymerizations.

The emulsion polymerization utilized in synthesizing the latices of this invention can be carried out over a broad temperature range from about 0° C. to as high as about 100° C. It is normally preferred for the emulsion polymerization to be carried out at a temperature which is within the range of about 5° C. to about 80° C. It is generally more preferred for the emulsion polymerization to be conducted at a temperature which is within the range of about 50° C. to about 70° C.

After the desired degree of monomer conversion has been attained, a conventional shortstopping agent, such as hydroquinone, can be added to the polymerization medium to end the polymerization. The polymerization will typically be allowed to continue until a high level conversion has been achieved. In most cases, the monomer conversion reached will be at least about 90 percent with monomer conversions of at least about 95 percent being preferred. This will typically correspond to a solids content of at least about 38 percent and preferably at least about 40 percent.

After the polymerization has been shortstopped, it is generally desirable to strip unreacted monomers from the emulsion. This can be accomplished using conventional techniques such as steam-stripping.

After the polymerization has been terminated and the latex has optionally been stripped of unreacted monomers, the latex can be utilized in making adhesive compositions. These adhesive compositions are, of course, useful in adhering synthetic fibers to rubber and are comprised of (1) resorcinol, (2) formaldehyde and (3) the latex of this invention. The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the acrolein latex or formed separately in aqueous solution, are considerably superior to other condensation products in the adhesive mixture.

The resorcinol may be dissolved in water to which around 37 percent formaldehyde has been added together with a strong base such as sodium hydroxide. The strong base should generally constitute around 7.5 percent or less of the resorcinol. The aqueous solution of the resole or condensation product or resin is, of course, mixed with the latex of this invention. The resole or other mentioned condensation product or materials that form said condensation product should constitute from 5 to 40 parts and preferably around 10 to 25 parts by solids of the latex mixture. The condensation product forming the resole or resole type resin forming materials should preferably be partially reacted or reacted so as to be only partially soluble in water. Sufficient water is then preferably added to give around 12 percent to 18 percent by weight overall solids in the final dip.

It is normally preferable to first prepare the copolymer of the diolefin and unsaturated aldehyde and then add the partially condensed condensation product. However, the ingredients (the resorcinol and formaldehyde) can be added to the latex in the uncondensed form and the entire condensation can then take place in situ. The latex tends to keep longer and be more stable if it is kept at an alkaline pH level.

In accordance with this invention, the cord or fabric to be treated is dipped for one to three minutes in the RFL dip of this invention and dried at a temperature within the range of about 75° C. to about 265° C. for about 0.5 minutes to about 20 minutes and thereafter calendered into the rubber and cured therewith. The drying step utilized will preferably be carried out by passing the cord through 2 or more drying ovens which are maintained at progressively higher temperatures. For instance, it is highly preferred to dry the cord by passing it through a first drying oven which is maintained at a temperature of about 250° F. (121° C.) to about 300° F. (149° C.) and then to pass it through a second oven which is maintained at a temperature which is within the range of about 350° F. (177° C.) to about 500° F. (260° F.). It should be appreciated that these temperatures are oven temperatures rather than the temperature of the cord being dried. The cord will preferably have a total residence time in the drying ovens which is within the range of about 1 minute to about 5 minutes. For example, a residence time of 30 seconds to 90 seconds in the first oven and 30 seconds to 90 seconds in the second oven could be employed.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, a latex was prepared in a 1-gallon (3.76 liter) reactor using the technique of this invention. In the procedure used, a soap solution was made by mixing 2.4 grams of a potassium hydroxide solution, 3.53 grams of a condensed naphthalene sulfonic acid soap, 1.2 grams of sodium sulfate, 270 grams of the potassium soap of rosin acid, 26.08 grams of the sodium salt of n-dodecyl benzene sulfonic acid and 3 grams of potassium persulfate into 1323.4 grams of water. This soap solution had a pH which was within the range of 10 to 11. A monomer solution was also made by mixing 261 grams of styrene, 36 grams of 2-vinylpyridine, 27 grams of methacrolein and 7.8 grams of t-dodecylmercaptan under an exhaust hood.

The soap solution was charged into the reactor first, followed by the monomer solution, and finally 876 grams of 1,3-butadiene monomer. Polymerization was initiated by increasing the temperature of the polymerization medium to 120° F. (49° C.). As the polymerization proceeded, the reaction temperature was allowed to increase and reached 135° F. (57° C.) at a solids content of 35 percent. After a polymerization time of about 8–10 hours, the latex being synthesized reached a solids content of about 42 percent. Then about 12 grams of a shortstop solution was added to terminate the polymerization.

EXAMPLES 2–13

In this series of experiments, the procedure described in Example 1 was repeated except that the monomer charge utilized was varied as shown in Table I.

TABLE I

| Example | Butadiene | Styrene | Methacrolein | VP |
| --- | --- | --- | --- | --- |
| 1 | 876 g | 261 g | 27 g | 36 g |
| 2* | 876 g | 297 g | 27 g | — |
| 3* | 876 g | 267 g | 54 g | — |
| 4* | 876 g | 243 g | 81 g | — |
| 5 | 876 g | 234 g | 54 g | 36 g |
| 6 | 876 g | 207 g | 81 g | 36 g |
| 7 | 876 g | 198 g | 54 g | 72 g |
| 8 | 876 g | 225 g | 27 g | 72 g |
| 9 | 876 g | 171 g | 81 g | 72 g |
| 10 | 876 g | 225 g | 27 g | 72 g |
| 11 | 876 g | 225 g | 27 g | 72 g |
| 12 | 876 g | 225 g | 27 q | 72 g |
| 13 | 867 g | 225 g | 27 g | 72 g |

*Examples 2, 3 and 4 were conducted as comparative Examples since the latex synthesized did not contain any 2-vinylpyridine.

EXAMPLE 14

In this experiment, an RFL dip was made utilizing the latex synthesized in Example 8. A non-adhesive activated polyester tire cord was then dipped with the RFL dip and evaluated to determine adhesion characteristics and resistance to heat degradation.

In the procedure used, the latex synthesized in Example 8 was employed in making a RFL dip formulation using standard techniques. It was then applied to non-adhesive activated polyester tire cord and dried by heating for 60 seconds at 280° F. (138° C.) followed by heating for 60 seconds at 490° F. (254° C.). The dipped polyester cord was then embedded in a productive rubber formulation containing a sulfenamide/sulfur cure system. The rubber containing the polyester cord embedded therein was then cured for 2.5 hours at 177° C. The polyester cord was subsequently removed from the cured rubber by carefully cutting it out with a sharp knife. The polyester cord was then tested on an Instron tensile testing machine and its break strength was determined to be 174 Newtons. This compares very favorably to the break strength of a control (138 Newtons) which was made utilizing a conventional RFL dip. The latex employed in making the conventional RFL dip contained 50 percent styrene-butadiene latex and 50 percent VP latex (15 percent vinylpyridine, 15 percent styrene and 70 percent butadiene).

The dipped polyester cords were also evaluated to determine 2-ply strip adhesion and compared to the control cords. The 2-ply strip adhesion test was carried out at a temperature of 250° F. (121° C.). The 2-ply strip adhesion tests were carried out on test strips which had been cured for 6 minutes at 340° F. (171° C.), for 13 minutes at 340° F. (171° C.) and for 10 minutes at 360° F. (182° C.). Adhesion tests were, of course, also conducted on corresponding control samples. The results of this adhesion testing is reported in Table II. The amount of force required to separate the strip is reported in Newtons. Thus, higher values are indicative of better cord to rubber adhesion.

TABLE II

| Cure Conditions | Experimental Latex | Control |
| --- | --- | --- |
| 6 minutes at 171° C. | 126 Newtons | 124 Newtons |
| 13 minutes at 171° C. | 119 Newtons | 125 Newtons |
| 10 ininutes at 182° C. | 103 Newtons | 102 Newtons |

Table II shows that the adhesion attained utilizing the experimental latex of this invention in the RFL dip was essentially equivalent to the adhesion achieved with the control latex. However, the use of the experimental latex of this invention in the RFL dip resulted in much better resistance to thermal degradation. This is exemplified by the much higher level of break strength which was maintained by the polyester tire cord after being cured at 177° C. for 2.5 hours. In fact, the break strength of the polyester tire cord which was dipped with the latex of this invention was about 26 percent greater than the break strength of the polyester tire cord which was dipped in the control RFL dip (174 N vs. 138 N).

EXAMPLE 15

In this experiment, the latex of this invention was evaluated in an RFL dip using the same procedure as was employed in Example 14 except that the evaluation was done utilizing an adhesive activated polyester tire cord. This evaluation also showed that the level of heat degradation which occurred was greatly reduced by utilizing the latex of this invention in place of the conventional VP latex in the RFL dip formulation. More specifically, the control had a break strength of 122 Newtons and the adhesive activated tire cords which were treated with the latex of this invention had a break strength of 145 Newtons.

The 2-ply strip adhesion test results carried out with the adhesive activated polyester tire cord are reported in Table III.

TABLE III

| Cure Conditions | Experimental Latex | Control |
| --- | --- | --- |
| 6 minutes at 171° C. | 137 Newtons | 82 Newtons |
| 13 minutes at 171° C. | 94 Newtons | 59 Newtons |
| 10 minutes at 182° C. | 91 Newtons | 74 Newtons |

As can be seen from Table III, the utilization of the latex of this invention in the RFL dip resulted in much better adhesion of the adhesive-activated polyester tire cords to the cured rubber test strips. This experiment accordingly shows that much better adhesion characteristics as well as better resistance to thermal degradation was attained with the latex of this invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An adhesive composition which is particularly useful for adhering synthetic fibers to rubber which is comprised of (1) resorcinol, (2) formaldehyde and (3) a latex which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer.

2. A process for adhering synthetic textile fibers to sulfur vulcanizable rubbers comprising the steps of (I) immersing said fibers in an aqueous dispersion of (1) resorcinol, (2) formaldehyde and (3) a latex which is comprised of (a) water, (b) an emulsifier and (c) a polymer which is comprised of repeat units which are derived from (i) a conjugated diolefin monomer, (ii) a vinyl aromatic monomer, (iii) 2-vinylpyridine and (iv) a vinyl aldehyde monomer, to produce dipped fibers; (II) drying said dipped fibers to produce dried dipped fibers; (III) placing the dried dipped fibers in contact with the sulfur vulcanizable rubber; and (IV) curing the sulfur vulcanizable rubber while it is in contact with said dried dipped fibers.

3. A composite article of rubber and fabric comprising textile fibers having distributed over surface portions thereof a mixture of (a) a polymer which is comprised of repeat units which are derived from (i) a conjugated diolefin monomer, (ii) a vinyl aromatic monomer, (iii) 2-vinylpyridine and (iv) a vinyl aldehyde monomer; (b) a resinous condensation product of a phenol and an aldehyde; and (c) an in situ vulcanized rubber compound contacting the coated surfaces of said fibers.

4. A composite article of rubber and fabric as specified in claim 3 wherein said fibers are polyester fibers.

5. A composite article of rubber and fabric as specified in claim 4 wherein said polyester fibers are activated polyester fibers.

6. An adhesive composition as specified in claim 2 wherein the conjugated diolefin monomer is 1,3-butadiene.

7. An adhesive composition as specified in claim 6 wherein the vinyl aromatic monomer is styrene.

8. An adhesive composition as specified in claim 7 wherein the vinyl aldehyde monomer is of the structural formula:

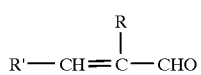

wherein R is selected from the group consisting of hydrogen atoms, alkyl groups containing from 1 to about 4 carbon atoms, phenyl groups, benzyl groups, α-alkoxy groups and α-amido groups and wherein R' is selected from the group consisting of hydrogen atoms, alkyl groups containing from 1 to about 4 carbon atoms, phenyl groups and benzyl groups.

9. An adhesive composition as specified in claim 8 wherein R is selected from the group consisting of methylene groups and ethylene groups, and wherein R' is selected from the group consisting of hydrogen atoms, methyl groups and ethyl groups.

10. An adhesive composition as specified in claim 8 wherein R represents a methylene group.

11. An adhesive composition as specified in claim 7 wherein the vinyl aldehyde monomer is methacrolein.

12. An adhesive composition as specified in claim 1 wherein the polymer is comprised of repeat units which are derived from (i) about 45 weight percent to about 88 weight percent conjugated diolefin monomers, (ii) from about 10 weight percent to about 30 weight percent vinyl aromatic monomers, (iii) from about 1 weight percent to about 15 weight percent 2-vinylpyridine monomer and (iv) from about 1 weight percent to about 10 weight percent of the vinyl aldehyde monomers.

13. An adhesive composition as specified in claim 1 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomers.

14. An adhesive composition as specified in claim 1 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomer.

15. An adhesive composition as specified in claim 1 wherein the polymer is comprised of repeat units which are derived from (i) about 65 weight percent to about 75 weight percent 1,3-butadiene monomer, (ii) from about 20 weight percent to about 25 weight percent styrene monomer, (iii) from about 3 weight percent to about 6 weight percent 2-vinylpyridine monomer and (iv) from about 2 weight percent to about 4 weight percent methacrolein monomer.

16. An adhesive composition as specified in claim 12 wherein said emulsifier is present at a level of about 0.2 parts per hundred parts of rubber to about 6 parts per hundred parts of rubber.

17. An adhesive composition as specified in claim 13 wherein said emulsifier is present at a level of about 1 part per hundred parts of rubber to about 5 parts per hundred parts of rubber.

18. An adhesive composition as specified in claim 15 wherein said emulsifier is present at a level of about 2 parts per hundred parts of rubber to about 4 parts per hundred parts of rubber.

19. An adhesive composition as specified in claim 16 wherein said latex has a solids content of at least about 38 percent.

20. An adhesive composition as specified in claim 18 wherein said latex has a solids content of at least about 40 percent.

21. An adhesive composition as specified in claim 7 wherein the vinyl aldehyde monomer is of the structural formula:

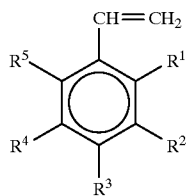

wherein $R^1$, $R^2$, $R^3$, $R^4$ and $R^5$ can be the same or different and are selected from the group consisting of hydrogen atoms, normal-alkyl groups and aldehyde functionality, with the proviso that one and only one of said moieties selected from the group consisting of $R^1$, $R^2$, $R^3$, $R^4$ and $R^5$ is an aldehyde functionality.

22. An adhesive composition as specified in claim 7 wherein the vinyl aldehyde monomer is of the structural formula:

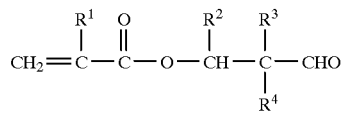

wherein $R^1$ represents a hydrogen atom or a methyl group, wherein $R^2$ represents a hydrogen atom or an alkyl group containing from 1 to 3 carbon atoms, wherein $R^3$ represents a methyl group or an ethyl group, and wherein $R^4$ represents an alkyl group containing from 1 to 4 carbon atoms.

23. A process as specified in claim 2 wherein the dipped fibers are dried at a temperature which is within the range of about 75° C. to about 265° C.

24. A process as specified in claim 23 wherein the conjugated diolefin monomer is 1,3-butadiene.

25. A process as specified in claim 24 wherein the vinyl aromatic monomer is styrene.

26. A process as specified in claim 25 wherein the vinyl aldehyde monomer is of the structural formula:

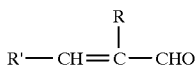

wherein R is selected from the group consisting of hydrogen atoms, alkyl groups containing from 1 to about 4 carbon atoms, phenyl groups, benzyl groups, α-alkoxy groups and α-amido groups and wherein R' is selected from the group consisting of hydrogen atoms, alkyl groups containing from 1 to about 4 carbon atoms, phenyl groups and benzyl groups.

27. A process as specified in claim 26 wherein R is selected from the group consisting of methylene groups and ethylene groups, and wherein R' is selected from the group consisting of hydrogen atoms, methyl groups and ethyl groups.

28. A process as specified in claim 26 wherein R represents a methylene group.

29. A process as specified in claim 25 wherein the vinyl aldehyde monomer is methacrolein.

30. A process as specified in claim 23 wherein the polymer is comprised of repeat units which are derived from (i) about 45 weight percent to about 88 weight percent conjugated diolefin monomers, (ii) from about 10 weight percent to about 30 weight percent vinyl aromatic monomers, (iii) from about 1 weight percent to about 15 weight percent 2-vinylpyridine monomer and (iv) from about 1 weight percent to about 10 weight percent of the vinyl aldehyde monomers.

31. A process as specified in claim 23 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomers.

32. A process as specified in claim 23 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomer.

33. A process as specified in claim 23 wherein the polymer is comprised of repeat units which are derived from (i) about 65 weight percent to about 75 weight percent 1,3-butadiene monomer, (ii) from about 20 weight percent to about 25 weight percent styrene monomer, (iii) from about 3 weight percent to about 6 weight percent 2-vinylpyridine monomer and (iv) from about 2 weight percent to about 4 weight percent methacrolein monomer.

34. A process as specified in claim 30 wherein said emulsifier is present at a level of about 0.2 part per hundred parts of rubber to about 6 parts per hundred parts of rubber.

35. A process as specified in claim 31 wherein said emulsifier is present at a level of about 1 part per hundred parts of rubber to about 5 parts per hundred parts of rubber.

36. A process as specified in claim 32 wherein said emulsifier is present at a level of about 2 parts per hundred parts of rubber to about 4 parts per hundred parts of rubber.

37. A process as specified in claim 34 wherein said latex has a solids content of at least about 38 percent.

38. A process as specified in claim 35 wherein said latex has a solids content of at least about 40 percent.

39. A process as specified in claim 25 wherein the vinyl aldehyde monomer is of the structural formula:

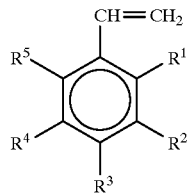

wherein $R^1$, $R^2$, $R^3$, $R^4$ and $R^5$ can be the same or different and are selected from the group consisting of hydrogen atoms, normal-alkyl groups and aldehyde functionality, with the proviso that one and only one of said moieties selected from the group consisting of $R^1$, $R^2$, $R^3$, $R^4$ and $R^5$ is an aldehyde functionality.

40. A process as specified in claim 25 wherein the vinyl aldehyde monomer is of the structural formula:

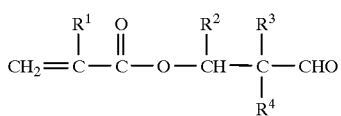

wherein $R^1$ represents a hydrogen atom or a methyl group, wherein $R^2$ represents a hydrogen atom or a an alkyl group containing from 1 to 3 carbon atoms, wherein $R^3$ represents a methyl group or an ethyl group, and wherein $R^4$ represents an alkyl group containing from 1 to 4 carbon atoms.

41. A composite article as specified in claim 5 wherein the conjugated diolefin monomer is 1,3-butadiene.

42. A composite article as specified in claim 41 wherein the vinyl aromatic monomer is styrene.

43. A composite article as specified in claim 42 wherein the vinyl aldehyde monomer is of the structural formula:

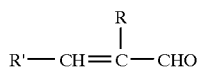

wherein R is selected from the group consisting of hydrogen atoms, alkyl groups containing from 1 to about 4 carbon atoms, phenyl groups, benzyl groups, α-alkoxy groups and α-amido groups and wherein R' is selected from the group consisting of hydrogen atoms, alkyl groups containing from 1 to about 4 carbon atoms, phenyl groups and benzyl groups.

44. A composite article as specified in claim 43 wherein R is selected from the group consisting of methylene groups and ethylene groups, and wherein R' is selected from the group consisting of hydrogen atoms, methyl groups and ethyl groups.

45. A composite article as specified in claim 43 wherein R represents a methylene group.

46. A composite article as specified in claim 42 wherein the vinyl aldehyde monomer is methacrolein.

47. A composite article as specified in claim 5 wherein the polymer is comprised of repeat units which are derived from (i) about 45 weight percent to about 88 weight percent conjugated diolefin monomers, (ii) from about 10 weight percent to about 30 weight percent vinyl aromatic monomers, (iii) from about 1 weight percent to about 15 weight percent 2-vinylpyridine monomer and (iv) from about 1 weight percent to about 10 weight percent of the vinyl aldehyde monomers.

48. A composite article as specified in claim 5 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomers.

49. A composite article as specified in claim 5 wherein the polymer is comprised of repeat units which are derived from (i) about 56 weight percent to about 82 weight percent 1,3-butadiene monomer, (ii) from about 15 weight percent to about 28 weight percent styrene monomer, (iii) from about 2 weight percent to about 10 weight percent 2-vinylpyridine monomer and (iv) from about 1 weight percent to about 6 weight percent of the vinyl aldehyde monomer.

50. A composite article as specified in claim 5 wherein the polymer is comprised of repeat units which are derived from (i) about 65 weight percent to about 75 weight percent 1,3-butadiene monomer, (ii) from about 20 weight percent to about 25 weight percent styrene monomer, (iii) from about 3 weight percent to about 6 weight percent 2-vinylpyridine monomer and (iv) from about 2 weight percent to about 4 weight percent methacrolein monomer.

51. A composite article as specified in claim 5 wherein the vinyl aldehyde monomer is of the structural formula:

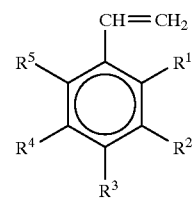

wherein $R^1$, $R^2$, $R^3$, $R^4$ and $R^5$ can be the same or different and are selected from the group consisting of hydrogen atoms, normal-alkyl groups and aldehyde functionality, with the proviso that one and only one of said moieties selected from the group consisting of $R^1$, $R^2$, $R^3$, $R^4$ and $R^5$ is an aldehyde functionality.

52. A composite article as specified in claim 5 wherein the vinyl aldehyde monomer is of the structural formula:

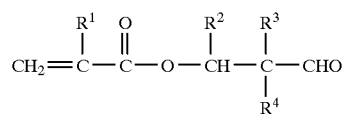

wherein $R^1$ represents a hydrogen atom or a methyl group, wherein $R^2$ represents a hydrogen atom or an alkyl group containing from 1 to 3 carbon atoms, wherein $R^3$ represents a methyl group or an ethyl group, and wherein $R^4$ represents an alkyl group containing from 1 to 4 carbon atoms.

* * * * *